Sept. 15, 1970 K. R. ARMSTRONG ET AL 3,528,593

ENDLESS LOOP TAPE BIN

Filed Feb. 26, 1968 3 Sheets-Sheet 1

INVENTORS.
KIRK R. ARMSTRONG,
EDWARD MIKOLYCZYK,

By THEIR ATTORNEYS
Spensley & Horn.

ENDLESS LOOP TAPE BIN

Filed Feb. 26, 1968

3 Sheets-Sheet 2

INVENTORS.
KIRK R. ARMSTRONG,
EDWARD MIKOLYCZYK,
By THEIR ATTORNEYS.
Spensley & Horn Sept. 15, 1970 K. R. ARMSTRONG ET AL 3,528,593

ENDLESS LOOP TAPE BIN

Filed Feb. 26, 1968 3 Sheets-Sheet 3

INVENTORS.
KIRK R. ARMSTRONG,
EDWARD MIKOLYCZYK,

BY THEIR ATTORNEYS
Spensley & Horn

United States Patent Office 3,528,593

Patented Sept. 15, 1970

3,528,593

ENDLESS LOOP TAPE BIN

Kirk R. Armstrong, San Clemente, and Edward Mikolyszyk, Los Angeles, Calif., assignors to Capital Records, Inc., Hollywood, Calif., a corporation of California Filed Feb. 26, 1968, Ser. No. 708,260
Int. Cl. G11b *15/58*
U.S. Cl. 226—97 10 Claims

ABSTRACT OF THE DISCLOSURE

A storage bin for an elongated recording medium, e.g., magnetic tape, said bin having an entrance port through which the medium is received and an exit port through which the medium is removed in the order of introduction to the bin and characterized by the fact that elastic dynamic fluid pressure is at least part of the means by which the mass of the medium is supported above the bottom surface of the bin whereby the medium may be withdrawn from the bottom of a mass and conducted to the exit port with a minimum of frictional resistance to such movement.

BACKGROUND OF THE INVENTION

Field of the invention

The field of the invention is that of storage of magnetic recording and reproducing tape wherein the tape is repeatedly employed for recording, playing back and erasing and particularly wherein the tape is formed into an endless loop.

In the handling of magnetic tape for sound reproducing and replaying, every effort must be made to eliminate any interengagement between the tape surfaces that will in any way mar or otherwise deleteriously affect the quality of the tape. This is particularly true where the tape is endless, i.e., formed into a loop which can thus be caused to be reproduced continuously or be reversed and replayed at various points. For such use, ideally, the tape is preferably delivered into a bin in random zig-zag folds or convolutions and is removed from the bottom of the bin. Heretofore, this desirable mode of storage has had several disadvantages and the primary disadvantage was that the loop or bight of tape at the bottom of the pile was the one to be removed and such removal involved frictional engagement between the two runs of the tape which were subjected to the weight of the total amount thus stored. Prior art devices have commonly employed buffer chambers to reduce inertia and facilitate the rapid movement of tape in a forward or reverse direction. These chambers have taken various forms such as shown in U.S. Pat. 2,889,491 issued on June 2, 1959 to D. N. McDonald. Other buffer chambers for movie film, such as shown in U.S. Pat. 2,808,259 issued on Oct. 1, 1957 to R. W. Wengel, have employed air streams in combination with fingers distributed over the opposing surfaces of the chamber for supporting the edges of the film. The edge supports are required to support the film above the bottom of the chamber and to support the film when the blower is turned off and thereby prevent buckling. The present invention proposes the provision of a storage bin in which the tape convolutions are supported above the bottom of the bin at least in part by an interposed, constantly maintained air cushion and thus the lower convolutions can be led downwardly from the air supported mass with a minimum of resistance. Other objects and advantages will appear as the description of a presently preferred embodiment of the invention proceeds.

BRIEF DESCRIPTION OF THE DRAWINGS

In the drawings which form a part of the following specification of a presently preferred embodiment of the invention.

DETAILED DESCRIPTION OF PREFERRED EMBODIMENT

Figures 1A, 1B, 2, 11:
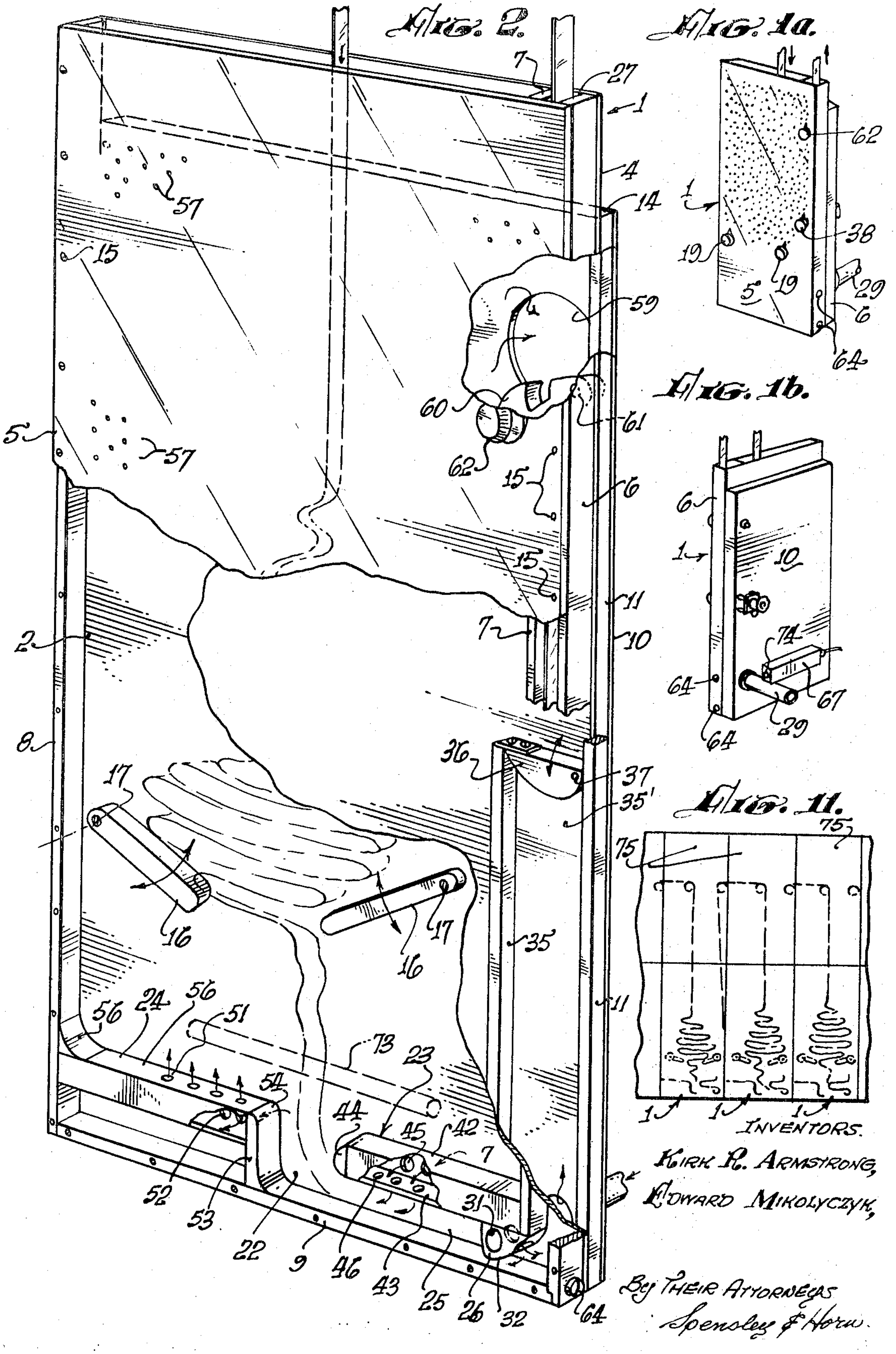
FIGS. 1*a* and 1*b* are reduced scale, perspective views of a presently preferred embodiment of the invention as viewed from the opposite sides thereof.
FIG. 2 is a greatly enlarged, perspective view taken from substantially the same point as FIG. 1*a* but with certain portions of the structure broken away to show details of interior construction.

Referring first to FIGS. 1*a* and 1*b*, the disclosed embodiment of the invention comprises a body structure 1 of thin rectangular configuration as viewed in elevation, including a tape container or bin compartment, generally indicated at 2, and an air transfer plenum 3 of the same width but of less thickness and height than the bin compartment. This body structure can conveniently be formed of rigid plastic structural members including a dividing web or partition 4 between said compartments, an outer sheet or bin side wall 5 spaced from one side of the partition 4 by a pair of spaced front edge wall means 6 and 7 forming a tape guide to be later described, a rear wall 8 and a bottom wall member 9 for the bin compartment 2, the top thereof being open. A plenum outer wall member 10 is spaced from the opposite side of the partition member 4 by front and rear edge members 11 and 12 and bottom and top members 13 and 14 to complete the enclosure of the plenum compartment 3. All of said members can be interconnected by any suitable means, e.g., screws 15 extending through the outer wall members and threadedly engaging the appropriate ones of the interposed front and rear edge, bottom, or top members. Various elements of the above body structure have certain opening or removable parts which will presently be described in more detail, the above recitation being intended primarily to identify the main components of the supporting body structure.

Figures 3, 4:
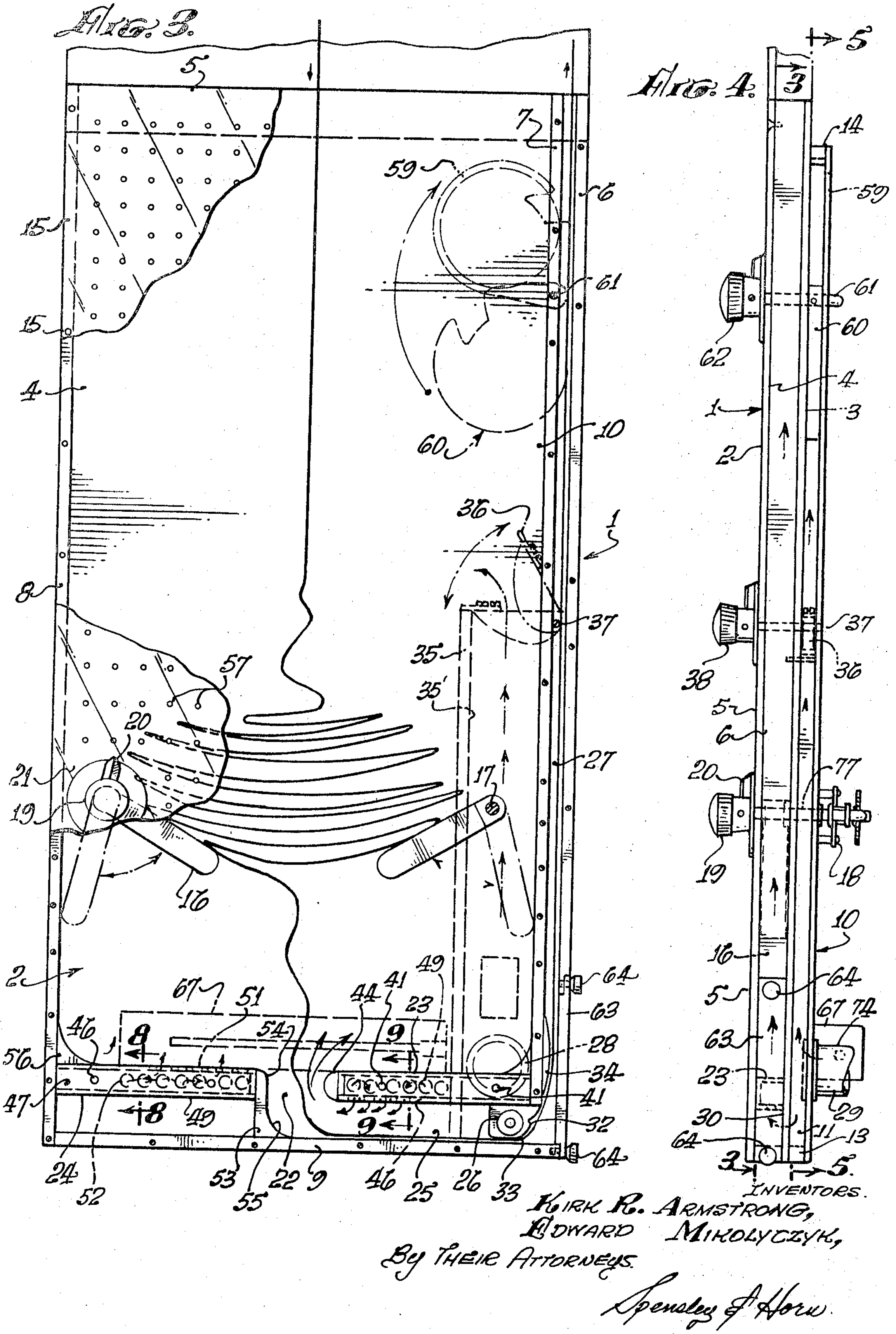
FIG. 3 is a side elevational view taken generally in the plane of the line 3—3 of FIG. 4.
FIG. 4 is an edge elevational view taken as from the right hand edge of FIG. 3.
Figures 5, 6, 7, 8, 9, 10:
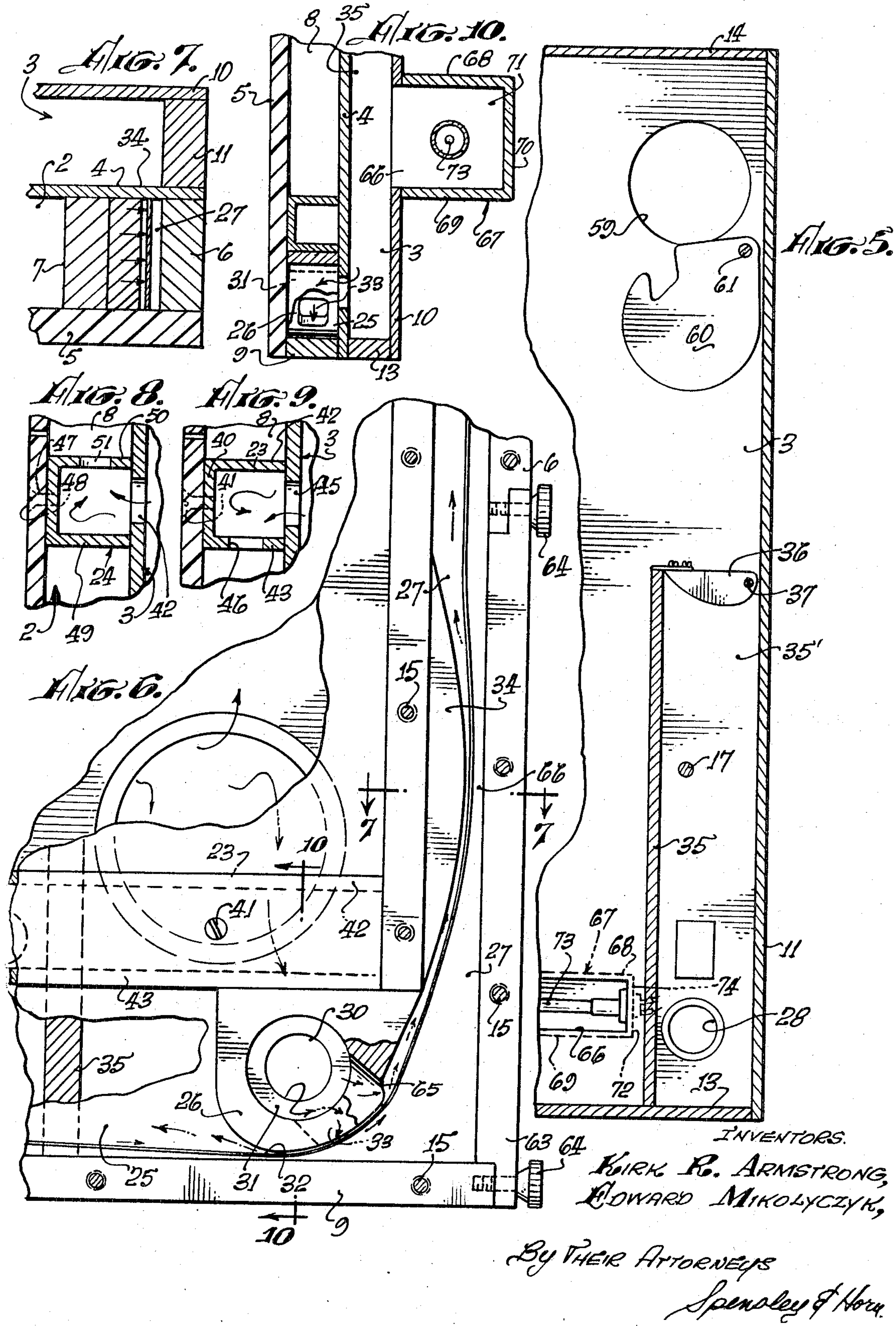
FIG. 5 is a reduced scale, fragmentary, sectional view taken in the plane of the line 5—5 of FIG. 4.
FIG. 6 is a greatly enlarged, side elevational view of a portion of the device constituting the lower right hand corner of FIG. 3, portions of the side wall being broken away to disclose details of interior construction.
FIG. 7 is a greatly enlarged fragmentary sectional plan view taken on the line 7—7 of FIG. 6.
FIGS. 8 and 9 are, respectively, fragmentary sections taken on the lines 8—8 and 9—9 of FIG. 3.
FIG. 10 is a greatly enlarged elevational section taken on the line 10—10 of FIG. 6; and, FIG. 11 is a semi-diagrammatic view showing the capability of the device for interconnection in multiple units operating in series to store greater lengths of film loop than could be contained in a single storage bin of the invention.

Mounted within the bin compartment 2 and spaced from the bottom thereof are tape mass supporting arms 16, 16 each being mounted on one each of a pair of supporting shafts 17, 17 extending transversely of the body structure and being journaled in the outer wall members 5 and 10, as well as in the partition 4, and being disposed laterally inwardly of the bin edge walls 7 and 8. These shafts project beyond the walls 5 and 10 and at the ends thereof projecting beyond the wall 10 each shaft carries a friction device 18 operable to maintain the shaft against other than intended rotational movement and, at the opposite end thereof projecting beyond the wall 5, each shaft carries a hand knob 19 by which the arm 16 may be adjusted to varying degrees of inclination downwardly from the shafts and toward the midlength of the bin and said arms having a width only slightly less than the spacing between the bin walls 4 and 5. The arms are movable through a range between the full line and dotted line positions shown in FIG. 3, the position of the arms being indicated by a pointer 20 attached to the knob 19 and registering with graduations on a scale 21 on the outer surface of the wall 5. As the tape is delivered into the open top of the bin, air pressure means presently to be described, causes the tape to tend to pile up on the arms 16, 16 in a somewhat irregular zig-zag configuration as will be later described.

The tape falls free from the bottom of the mass supported by the arms 16, 16 downwardly into a throat portion 22 formed by the side walls 4 and 5 and the front and rear air outlet members 23 and 24, to be later described in detail, and thence along a channel 25 formed by the said side walls, the underside of the air outlet member 23 and the bottom 19 toward the wall 7, thence around the corner forming means 26 into the vertical tape delivery channel 27 formed by the said side walls and the walls 6 and 7 to the top of the body structure.

The plenum outer wall 10, at a point thereon adjacent the point in the tape compartment at which outgoing tape enters the channel 27, is provided with an air inlet port 28 which carries an outwardly extending sleeve or nipple 29 affording connection with a source of compressed air. The partition 4, directly opposite the port 28, is provided with an opening 30 which communicates with a bore 31 extending transversely through the corner forming means 26, the end of said bore remote from the opening 30 being closed by engagement with the inner face of the wall member 5. The corner forming means 26 comprises a block of plastic material attached to the under face of the front air outlet member 23 and is disposed adjacent to the corner of the bin compartment formed by the bottom wall 9 and the edge wall 6, the outer face 32 of said corner forming member adjacent the juncture of said walls being rounded and being spaced from said walls to permit passage of the tape. A bore 33 extends radially from the bore 31 out of said rounded face for a purpose to be described. The upper face of the member 26 extends beyond the adjacent end of the air outlet member 23 a distance equal to the thickness of the edge wall member 7 wherefore the continuation of the tape passageway around the member 26 is smooth and continuous. Above the lower end thereof, the face of the wall member 7 adjacent the wall member 6 carries an elongated convexly curved member 34 which forms a momentary restriction in the tape delivery channel 27, the purpose of which will be later explained.

A partition member 35 is disposed between the walls 4 and 10 parallel to the wall 11 thereof, but at the opposite side of the port 28, said wall extending part way up only and combining with the walls 4, 10 and 11 to form a passageway 35′ from which some of the air received from the inlet port 28 is delivered through the opening 30 to the bores 31 and 33 of the corner forming means as previously described. The passageway is optionally closed or variably opened at its upper end by a damper member 36 carried by a cross shaft 37 journaled in the walls 4, 5 and 10 and operated by a hand knob 38 carried by a portion of said shaft which projects outwardly from the wall 5 and said hand knob carrying a pointer 39 effective to indicate the position of the damper. The extent to which the damper is opened determines the rate of flow of air into the plenum chamber 3.

The air outlet member 23 is of elongated horizontal rectangular configuration, of the same width as the tape bin 2 and includes a side wall 40 secured to the inner face of the wall 5 by screws 41, an imperforate top wall 42 and a bottom wall 43 parallel to and spaced from the top wall 42, the edges of said top and bottom wall engaging the adjacent side of the partition 4. One end of the member 24 abuts the wall member 7 and the opposite end forms one side of the throat 22 and is rounded as at 44 to provide a smooth surface for non-obstructing engagement by the tape passing through the throat. The open side of the member 23 communicates with a series of openings 45 through the partition 4 and the bottom 43 of the member 23 is likewise provided with a series of openings 46 whereby air entering from plenum chamber 3 is discharged into the tape bin through openings 46.

The rear air discharge member 24 is generally similar to the member 23 and comprises a side wall 47 secured to the inner face of the tape bin wall 5 by screws 48, an imperforate lower wall 49 and an upper wall 50 having a series of openings 51 extending therethrough. The open side of the member 24 engages the wall 4 opposite a series of openings 52 therethrough whereby air entering the plenum chamber is conducted into the member 24 and thence into the tape bin through the openings 51. One end of the member 24 engages the inner face of the wall 8 and the opposite end is closed by a member 53 mounted on the bottom wall 9 having a convex upper end 54 and a concave lower end 55 which combine with the rounded end 43 of the member 23 to provide a smooth rounded contour for the throat 22. A fillet member 56 eliminates the corner formed by the top wall 50 and bin wall 8.

The upper portion of the bin side wall 5 is provided with a series of air escape perforations 57 which extend down to a rounded configuration of said perforations at about the lowest point occupied by a mass of tape resting on the arm members 17 as indicated at 58 in FIG. 1. Additionally, the upper portion of the plenum outer wall 10 is provided with an air escape port 59 adapted to be variably closed by a damper member 60 carried by a rock shaft 61 journaled in the side walls 4, 5 and 10 and operated by hand knob 62. Access for threading film into the apparatus and for cleaning the removable section of a lower portion of the wall 6 is provided as shown at 63, the wall portion 63 being secured to the end of the wall 9 and to the lower end of the wall 6 by thumb screws 64, 64 as well as through the wall 5 by certain of the screws 15.

For those uses in which static electricity on the tape present a problem, the apparatus may be provided with a suitable means for overcoming this problem. By way of example, the outer wall 10 at a point thereon opposite the openings into the members 23 and 24 may be provided with a horizontally extending opening 66 substantially longitudinally coextensive with the openings 45 and 52 said opening being enclosed by a housing 67 comprising top and bottom walls 68 and 69, a side wall 70 and end walls 71 and 72, one of said end walls serving as a mounting means for an electrode 73 contained within the said housing and having exteriorly disposed terminal means 74 affording connection to a suitable voltage source whereby the air flowing through the plenum chamber 3 into the storage bin 4 will be negatively ionized.

The operation of the device is as follows: assuming that the device is loaded with a major portion of an endless tape disposed in the bin compartment, upon the introduction of air under pressure through the port 28, a portion of the air will enter the bin compartment through the radial opening 31 tending to move the tape away from the rounded surface of the block 29, a portion of that air escaping upwardly through the channel or passageway 27 and as an incident to such an incident to such passage crossing the relieved portion 65 at the end of said rounded surface which insures further against surface contact of the out-going tape with its guide means. Additionally, the crest of the convex member 34, tends to limit the volume of flow of air through the passage 27 while increasing the linear speed of flow therethrough to assist in keeping the film from frictional contact with the curved member 34 while cooperating with the members 23 and 24 to build up the required pressure in the storage bin as will presently appear. Opening the damper 36 will allow the air under pressure to enter the plenum chamber 3 and thence, through openings 45 and 52 to enter the bin compartment chamber through ports 45 and 52 and create a dynamic pressure in the lower end of the bin compartment. When the device is in response, the mass of tape will slide downwardly along the surfaces of the arms 16, 16 and come to rest across or even projecting into the throat 22. At this point it should be mentioned that the width of said bin compartment is almost exactly the width of the tape or film being used so that little if any of the air can espace past the edges of the film.

Upon the application of this pressure within the bin, the mass of tape will be lifted from its position of repose and clear of the arms 16, 16, the extent of such lift being determined by the weight of the mass, the dynamic pressure exerted by the air deriving from the rate of entry and the rate of exhaust both through the tape discharge passage 27 and through such of the air escape perforations 57 as shall have been uncovered by the contour of the underside of the tape mass in response to the applied pressure. The most desirable contour is that of a slightly downwardly convex configuration. If the size of the mass and consequent weight is small and the arms 16, 16 are adjusted to a position approaching the horizontal, the airflow therebetween enroute to the escape perforations may cause the tape to assume a concave configuration. Adjusting the arms downwardly widens this throat with resultant reduction of the dynamic force exerted per unit of area on the tape permitting the weight of the tape to cause the underside of the bottom of the mass to assume the desired convex configuration.

As the tape is drawn through the passage 27, the convolutions of the tape will be guided by the downwardly sloping surfaces of the arms 16 to enter the horizontal passage 25 enroute to the corner forming member 26. At this point, the air entering through the bore 31 will hold the film out of frictional engagement with the rounded surface of that member and thus the film can be drawn completely out of the bin compartment with an absolute minimum of contact with any surface. It is particularly to be noted that during operation of the apparatus the mass of tape contained in the bin is solely supported by the air pressure beneath it so that the lowermost convolutions are not subjected to the weight of that mass of tape but can be readily withdrawn from the bottom thereof.

Referring finally to FIG. 11, there is shown somewhat diagrammatically the fact that a plurality of these devices can be arranged in edge to edge relation with film feeding devices 75 superimposed thereon for feeding tape from one device to the next one so that the length of the length of tape thus stored can be increased almost indefinitely.

While in the foregoing specification, there has been disclosed a presently preferred embodiment of the invention, such disclosure has been by way of example. Wherefore, the invention will not be deemed to be limited to the precise details of construction thus disclosed. Accordingly, it will be understood that the invention includes as well, all such changes and modifications in the parts and in the construction, combination and arrangement of parts as shall come within the purview of the appended claims.

We claim:

1. A device for handling an elongate recording medium comprising in combination:

(a) a bin structure into which the medium is introduced and from which the medium is withdrawn in the order of introduction;

(b) elastic fluid pressure means operating to supply a fluid under pressure to said bin to provide the sole support of the medium within said bin structure;

(c) said fluid pressure means including devices disposed adjacent the area of medium support operative to allow exhaust of said fluid at a rate sufficiently limited to maintain a desired degree of support for the medium.

2. The combination defined in claim 1 wherein said bin structure includes adjustable means disposed proximate and below the medium contained therein for selectively regulating the supporting force exerted by said fluid pressure means.

3. In the combination defined in claim 1 wherein said bin structure further includes fluid bearing means operative to prevent the surface of the medium from contacting any portion of said bin struction incident to withdrawal.

4. In a high speed magnetic tape handling means for use in conjunction with a magnetic recording means having a tape transport means, a tape storage and handling device comprising in combination:

(a) a bin structure into which the tape is deposited by the tape transport means and is withdrawn in the order of deposit, said bin structure having a tape inlet adjacent the top thereof and a tape outlet adjacent the bottom thereof;

(b) pressure fluid distribution means associated with said bin structure operative to create a dynamic pressure force affording the sole support of the tape contained in said bin structure;

(c) adjustable means operable to regulate the supporting force imposed on the tape in said bin structure;

(d) means for supplying fluid to said distribution means; and, (e) means on said bin structure operative to limit the rate of exhaust of said tape supporting fluid to a rate which will create a desired magnitude of support for the tape.

5. A tape handling means as claimed in claim 4 in which said adjustable means comprises a pair of tape engaging arms oppositely disposed within said bin structure and below said tape and means disposed externally of said structure operable to adjust the angular positions of said arms.

6. A tape handling means as claimed in claim 4 wherein a wall component of said bin structure is provided with a predetermined matrix of fluid exhaust openings extending from an area proximate the bottom of said bin structure toward the top of said structure.

7. A tape handling means as claimed in claim 4 wherein said bin structure further defines therewithin a plurality of fluid bearing surfaces affording frictionless support of the tape incident to withdrawal of the tape from said bin structure.

8. In the combination defined in claim 4, wherein said bin structure includes the static electricity elimination means operative to impart a neutral charge to the tape.

9. The static electricity elimination means according to claim 8 comprising a fluid conducting means for conducting said pressure fluid from a point of reception thereof to said fluid distribution means and electrical means disposed within said fluid conducting means operable to ionize pressure fluid conducted therethrough.

10. A high speed magnetic tape handling and storage device comprising in combination:

(a) a bin structure into which the tape is introduced and from which the tape is withdrawn in the order of introduction thereinto, said bin structure including (1) a main tape storage area wherein the tape is pneumatically supported, (2) a tape plenum spaced apart from said storage area, and (3) an air plenum spaced apart from said storage area and said tape plenum;

(b) first and second air distribution manifolds disposed adjacent the bottom of said bin structure and commonly connecting said air plenum and said storage area, said first manifold being constructed to distribute air upward to a positive pressure area in support of the tape, said second manifold being constructed to distribute air in support of the tape to form an air bearing between said first and second manifolds for support of the tape incident to withdrawal therebetween;

(c) selectively adjustable means disposed within said storage area above said distribution manifolds and below the stored tape operative to vary the area of the stored tape upon which said positive pressure is imposed;

(d) air passage means forming a plurality of fluid bearing surfaces affording frictionless support of the tape in its withdrawal path from its stored position; and, (e) air supply for introducing air to said distribution manifolds and bearing surfaces;

(f) a wall of said bin structure having a plurality of air exhaust openings extending therethrough permitting for exhaust of air supplied through said manifolds in an area adjacent the lowermost portion of the stored tape and the escape of air trapped within said storage area as the tape is deposited therein.

References Cited

UNITED STATES PATENTS 2,808,259 10/1957 Wengel ---------- 226—118 X

ALLEN N. KNOWLES, Primary Examiner

U.S. Cl. X.R.

226—118; 317—2